(12) United States Patent
Sergyeyenko et al.

(10) Patent No.: US 9,559,628 B2
(45) Date of Patent: Jan. 31, 2017

(54) HANDHELD POWER TOOL WITH COMPACT AC SWITCH

(71) Applicant: Black & Decker Inc., Newark, DE (US)

(72) Inventors: Oleksiy P. Sergyeyenko, Baldwin, MD (US); Timothy W. French, Hampstead, MD (US); Phillip Martinez, New Cumberland, PA (US); Yesman Wang, Xukuo (CN)

(73) Assignee: BLACK & DECKER INC., New Britain, CT (US)

( * ) Notice: Subject to any disclaimer, the term of this patent is extended or adjusted under 35 U.S.C. 154(b) by 514 days.

(21) Appl. No.: 14/063,503

(22) Filed: Oct. 25, 2013

(65) Prior Publication Data

US 2015/0115857 A1 Apr. 30, 2015

(51) Int. Cl.
| | | |
|---|---|---|
| *H02P 3/00* | (2006.01) | |
| *H02P 27/00* | (2006.01) | |
| *H02P 1/02* | (2006.01) | |
| *B25F 5/00* | (2006.01) | |

(52) U.S. Cl.
CPC ............... *H02P 27/00* (2013.01); *B25F 5/00* (2013.01); *H02P 1/02* (2013.01)

(58) Field of Classification Search
CPC ............... H02P 27/00; H02P 1/02; B25F 5/00
USPC ......................................................... 318/504
See application file for complete search history.

(56) References Cited

U.S. PATENT DOCUMENTS

| | | |
|---|---|---|
| 3,564,372 A | 2/1971 | Vogelsberg |
| 3,660,742 A | 5/1972 | Gawron |
| 3,721,879 A | 3/1973 | Corey et al. |
| 3,848,168 A | 11/1974 | Hornung |
| 3,886,340 A | 5/1975 | Bittel |
| 3,935,522 A | 1/1976 | Tsay |
| 4,002,961 A | 1/1977 | Chang |
| 4,066,133 A | 1/1978 | Voss |
| 4,093,899 A | 6/1978 | Denny |
| 4,095,072 A | 6/1978 | Piber |
| 4,206,333 A | 6/1980 | Savas et al. |
| 4,227,128 A | 10/1980 | Cockroft et al. |
| 4,241,298 A | 12/1980 | Trammell, Jr. et al. |
| 4,249,117 A | 2/1981 | Leukhardt et al. |
| 4,274,037 A | 6/1981 | Soeda |
| 4,413,217 A | 11/1983 | Green et al. |
| 4,540,318 A | 9/1985 | Hornung et al. |
| 4,547,712 A | 10/1985 | Gotal et al. |
| 4,553,005 A | 11/1985 | Glenn |

(Continued)

*Primary Examiner* — Eduardo Colon Santana
*Assistant Examiner* — Gabriel Agared
(74) *Attorney, Agent, or Firm* — Stephen R. Valancius

(57) ABSTRACT

A power tool is disclosed having a compact AC switch assembly. An electric motor driving the power tool is contained within a housing that includes a handle. A trigger is slidingly received in the handle and moves in an axis of trigger travel along a trigger travel distance extending between an extended position of the trigger and a depressed position. A trigger switch including a printed circuit board is disposed in mechanical communication with the trigger and controls the electric motor in accordance with trigger position. The printed circuit board has a plurality of conductive traces that are sequentially arranged and linearly aligned adjacent the trigger in a direction that is transverse to the axis of trigger travel to reduce the width of the printed circuit board to a value that is less than or equal to three times the trigger travel distance.

30 Claims, 6 Drawing Sheets

(56) References Cited

U.S. PATENT DOCUMENTS

| | | |
|---|---|---|
| 4,628,233 A | 12/1986 | Bradus |
| 4,649,245 A | 3/1987 | Lessig, III et al. |
| 4,734,629 A | 3/1988 | Lessig, III et al. |
| 4,737,661 A | 4/1988 | Lessig, III et al. |
| 4,823,054 A | 4/1989 | Millauer |
| 4,864,083 A | 9/1989 | Bittel |
| 4,968,922 A | 11/1990 | Bittel |
| 5,115,175 A | 5/1992 | Fletcher |
| 5,276,392 A | 1/1994 | Beckerman |
| 5,289,047 A | 2/1994 | Broghammer |
| 5,512,810 A | 4/1996 | Hansen et al. |
| 5,585,758 A | 12/1996 | Prines et al. |
| 5,714,861 A | 2/1998 | Hansen et al. |
| 5,760,553 A | 6/1998 | Astic et al. |
| 5,856,731 A | 1/1999 | Rottmerhusen |
| 5,959,440 A | 9/1999 | Tobita et al. |
| 6,104,105 A | 8/2000 | Schaeffeler et al. |
| 6,160,365 A | 12/2000 | Younger et al. |
| 6,163,129 A | 12/2000 | Younger et al. |
| 6,208,113 B1 | 3/2001 | Lelkes et al. |
| 6,236,177 B1 | 5/2001 | Zick et al. |
| 6,346,790 B1 | 2/2002 | Kemp et al. |
| 6,380,702 B1 | 4/2002 | Rottmerhusen |
| 6,445,332 B1 | 9/2002 | Younger et al. |
| 6,445,966 B1 | 9/2002 | Younger et al. |
| 6,518,719 B1 | 2/2003 | Suzuki et al. |
| 6,536,536 B1 * | 3/2003 | Gass ................ B23B 31/123 173/171 |
| 6,717,080 B1 | 4/2004 | Chan et al. |
| 6,736,220 B1 | 5/2004 | Chan et al. |
| 6,749,028 B1 | 6/2004 | Chan et al. |
| 6,938,706 B2 | 9/2005 | Ng |
| 7,026,771 B2 | 4/2006 | Kushida et al. |
| 7,064,462 B2 | 6/2006 | Hempe et al. |
| 7,075,255 B1 | 7/2006 | Gambiana et al. |
| 7,112,900 B2 | 9/2006 | Brotto |
| 7,134,364 B2 | 11/2006 | Kageler et al. |
| 7,267,038 B2 | 9/2007 | Parks et al. |
| 7,280,016 B2 | 10/2007 | Taya et al. |
| 7,297,891 B2 | 11/2007 | Omori et al. |
| 7,330,004 B2 | 2/2008 | DeJonge et al. |
| 7,330,129 B2 | 2/2008 | Crowell et al. |
| 7,331,406 B2 | 2/2008 | Wottreng, Jr. et al. |
| 7,446,493 B2 | 11/2008 | Forster et al. |
| 7,487,844 B2 | 2/2009 | DeCicco et al. |
| 7,521,826 B2 | 4/2009 | Hempe et al. |
| 7,551,411 B2 | 6/2009 | Woods et al. |
| 7,667,560 B2 | 2/2010 | Taya et al. |
| 7,708,085 B2 | 5/2010 | DeCicco et al. |
| 7,817,384 B2 | 10/2010 | Woods et al. |
| 7,861,796 B2 | 1/2011 | DeCicco et al. |
| 7,896,001 B2 | 3/2011 | Harrison et al. |
| 7,921,889 B2 | 4/2011 | Pozgay et al. |
| 8,179,082 B2 | 5/2012 | Li et al. |
| 8,267,192 B2 | 9/2012 | Lopano et al. |
| 8,446,120 B2 | 5/2013 | Forster et al. |
| 2003/0146008 A1 | 8/2003 | Andriolo |
| 2006/0113930 A1 | 6/2006 | Andriolo |
| 2006/0152179 A1 | 7/2006 | Chang |
| 2006/0290306 A1 | 12/2006 | Broghammer |
| 2007/0085496 A1 * | 4/2007 | Philipp ................ A61B 17/151 318/139 |
| 2007/0256618 A1 | 11/2007 | Hamajima |
| 2008/0296139 A1 | 12/2008 | Morris et al. |
| 2009/0077820 A1 | 3/2009 | Gibbons et al. |
| 2009/0165615 A1 | 7/2009 | Nishimiya et al. |
| 2011/0056715 A1 | 3/2011 | Vanko et al. |
| 2011/0062933 A1 | 3/2011 | Tosuntikool et al. |
| 2011/0148332 A1 | 6/2011 | Kawano et al. |
| 2011/0241577 A1 | 10/2011 | Wiesner |
| 2011/0254472 A1 | 10/2011 | Forster et al. |
| 2012/0081044 A2 | 4/2012 | Wiesner |
| 2012/0235636 A1 | 9/2012 | Partovi |
| 2012/0292063 A1 | 11/2012 | Forster et al. |
| 2012/0292067 A1 | 11/2012 | Velderman et al. |
| 2013/0032010 A1 | 2/2013 | Lopano et al. |
| 2013/0061480 A1 * | 3/2013 | Baskar ................ B23D 51/03 30/371 |
| 2014/0131059 A1 * | 5/2014 | Verbrugge ................ B25F 5/02 173/217 |

\* cited by examiner

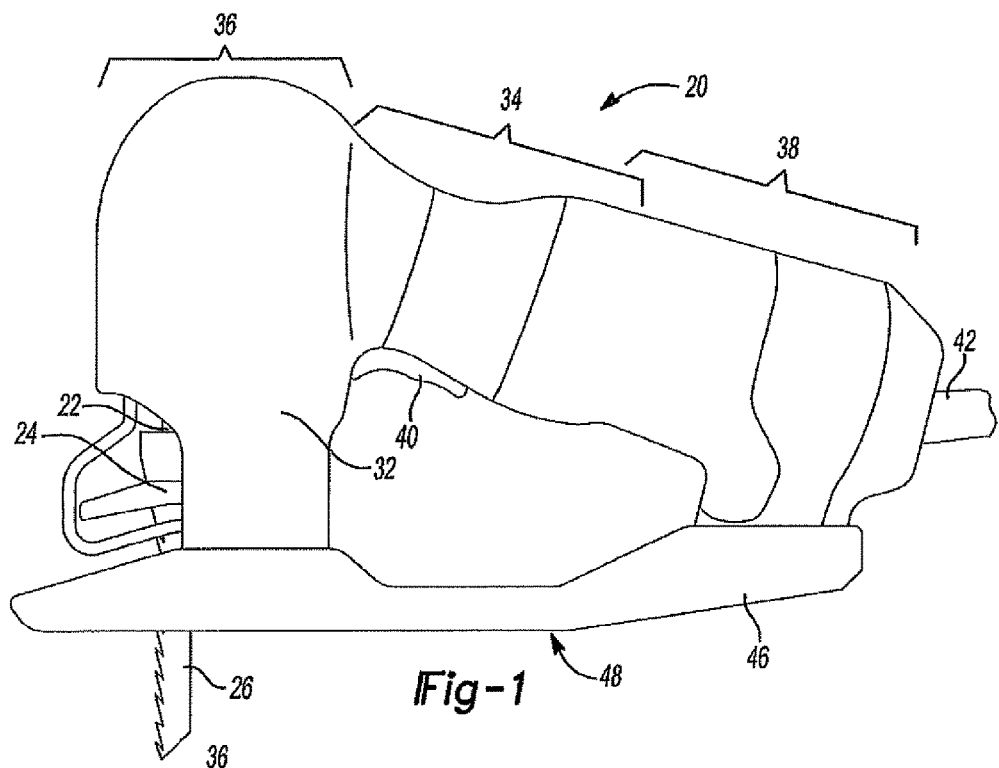
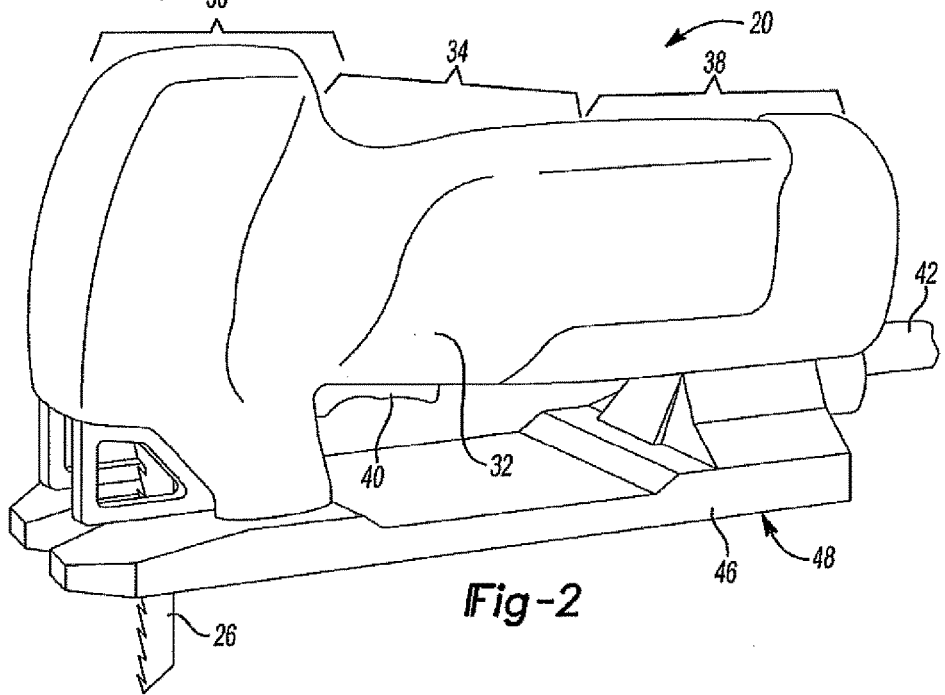

HANDHELD POWER TOOL WITH COMPACT AC SWITCH

FIELD

The present teachings relate to a power tool and more particularly to a handheld power tool having a compact AC switch assembly.

BACKGROUND

Power tools and more particularly handheld power tools are generally powered by electricity. Such power tools are typically used for residential and commercial construction, carpentry, repair, maintenance, and assembly projects, yard work, landscaping, and other related activities. Accordingly, the present disclosure encompasses a wide range of electric, handheld power tools including, without limitation, jigsaws, reciprocating saws, circular saws, chainsaws, drills, drivers, nail guns, staple guns, routers, rotary tools, paint guns, sanders, trimmers, and weed whackers.

Power tools typically have a driven shaft with an end for receiving a tool such as a saw blade, drill bit, sanding pad, or the like. An electric motor is coupled to the driven shaft for driving the same in a reciprocal, rotational, and/or orbital motion. A housing is typically provided for containing the electric motor. The housing may generally include a handle designed for a user to grip the power tool. A trigger is typically disposed along the handle for movement between an extended position and a depressed position. For many power tools, the user turns the power tool on by applying pressure to the trigger to move the trigger to the depressed position. By contrast, the user turns the power tool off by releasing pressure from the trigger allowing the trigger to return to the extended position.

Typically, the trigger is disposed in mechanical communication with a trigger switch positioned within the handle. The trigger switch usually includes a printed circuit board for controlling the electricity that is supplied to the electric motor. A problem that may arise with such a trigger switch configuration is that the printed circuit board, often housed within a trigger switch cover, takes up significant space within the handle and the handle must be designed to accommodate the width of the printed circuit board and/or the trigger switch cover. As such, the width of the printed circuit board and/or the trigger switch cover limits the packaging possibilities of power tools and dictates the size and design of the handle and housing.

SUMMARY

This section provides a general summary of the disclosure, and is not a comprehensive disclosure of its full scope or all of its features.

The present disclosure provides for a power tool having a compact AC switch assembly. The power tool includes a trigger switch disposed in mechanical communication with the trigger that controls the electric motor in accordance with position of the trigger in relation to the trigger switch. The trigger switch includes a printed circuit board that has a smaller width in comparison to conventional trigger switch circuit boards. The trigger defines an axis of trigger travel and a trigger travel distance as the trigger moves from the extended position to the depressed position. The printed circuit board disclosed herein has a plurality of conductive traces that are sequentially arranged and linearly aligned adjacent the trigger in a direction transverse to the axis of trigger travel. The sequential arrangement of the plurality of conductive traces reduces the width of the printed circuit board to a value that is less than or equal to two times the trigger travel distance. Advantageously, the reduced width of the printed circuit board allows for a thinner handle with improved ergonomics. This benefit improves the use of space within the housing and the handle and allows for new packaging configurations of handheld power tools that were not previously obtainable.

The present disclosure also provides for a trigger switch presenting a pin connector for connection with a microprocessor. The microprocessor includes a plurality of passive filtering components that provide digital control of the electric motor. Advantageously, the microprocessor can alter the analogue, linear relationship between motor speed and trigger position to provide features such as soft-start, where the motor speed increases more slowly over trigger positions adjacent the extended position. Accordingly, the microprocessor adds flexibility to the control of the electric motor. Also, certain electrical components can be eliminated from the printed circuit board when the microprocessor is connected because the passive filtering components of the microprocessor perform functions that would otherwise be performed by the trigger switch. As such, the printed circuit board of the trigger switch can be made smaller since fewer electrical components are needed. Also, the pin connector advantageously allows the microprocessor to be mounted within the housing at a location that is remote from the handle. Thus, the size of the handle can be further reduced because the handle does not need to accommodate the size of the microprocessor.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present teachings, wherein:

FIG. 1 is a side elevation view of an exemplary handheld power tool having a compact AC switch constructed in accordance with the present teachings;

FIG. 2 is a perspective view of another exemplary handheld power tool having a compact AC switch constructed in accordance with the present teachings;

DESCRIPTION OF THE ENABLING EMBODIMENT

Figure 3:
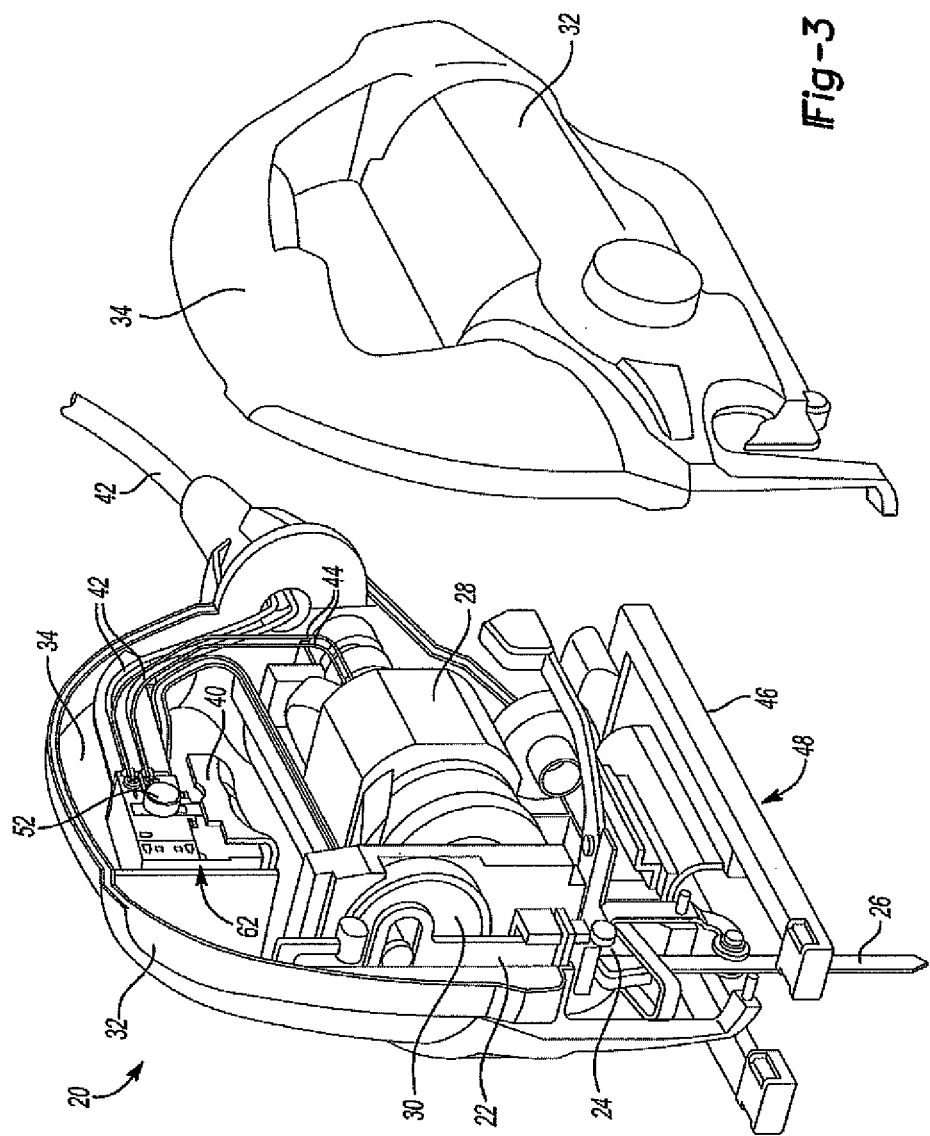
FIG. 3 is an exploded view of another exemplary handheld power tool having a compact AC switch constructed in accordance with the present teachings.

Referring generally to FIGS. 1-3, the power tool 20 may generally be a handheld power tool 20 having a driven shaft 22. The driven shaft 22 has an end 24 for receiving a tool 26. It should be appreciated that where the handheld power tool 20 is a jigsaw as shown in FIGS. 1-3, the end 24 of the driven shaft 22 can receive a saw blade as the tool 26. In another embodiment where the handheld power tool 20 is a drill, the end 24 of the driven shaft 22 can receive a drill bit or screw driver bit as the tool 26. In another embodiment where the handheld power tool 20 is a sander, the end 24 of the driven shaft 22 can receive a sanding pad which may be a segment of sandpaper, an abrasive pad, or an abrasive belt.

Still referring to FIGS. 1-3, the handheld power tool 20 has an electric motor 28. The electric motor 28 has a powered state and an unpowered state. The electric motor 28 receives no electricity when the electric motor 28 is in the unpowered state and the electric motor 28 does not move the driven shaft 22 in the unpowered state. Conversely, the electric motor 28 receives electricity when the electric motor 28 is in the powered state and the electric motor 28 moves the driven shaft 22 in the powered state. It should be appreciated that the electric motor 28 may turn at a plurality of motor speeds in the powered state and may have two directions of rotation based upon the polarity of the electricity supplied to the electric motor 28. The plurality of motor speeds may be measured by rotational speed such as by revolutions per minute (rpm). Alternatively, the electric motor 28 may provide only a single operational speed in the powered state. As such, the handheld power tool 20 may or may not have variable speeds and forward and reverse. Regardless, the electric motor 28 is coupled to the driven shaft 22 for driving the driven shaft 22. It should be appreciated that the electric motor 28 may be coupled to the driven shaft 22 by a drive mechanism 30 such as a transmission or an eccentric drive mechanism. Accordingly, the driven shaft 22 may rotate, reciprocate, and/or follow an orbital movement in response to being driven by the electric motor 28.

The handheld power tool 20 has a housing 32 that contains at least the electric motor 28. The housing 32 may take a variety of forms and may include one or more components. For example, the housing 32 may include two half shells as shown in FIG. 3. The housing 32 includes a handle 34, which may take several forms. For example, the handle 34 may be a separate component that is attached to the housing 32, an integral piece formed with the housing 32, or a combination thereof. Regardless, the handle 34 generally presents a location where a user may grip the handheld power tool 20. As shown in FIGS. 1-2, the housing 32 may additionally include a head portion 36 that contains at least a portion of the driven shaft 22 and an aft portion 38 that is spaced from the head portion 36 by the handle 34. In this configuration, the electric motor 28 is housed in the aft portion 38 of the housing 32 with a portion of the drive mechanism 30 extending from the electric motor 28 in the after portion 38, through the handle 34, and to the head portion 36.

The handheld power tool 20 includes a trigger 40 that is slidingly received in the housing 32 such that the trigger 40 extends at least partially through the handle 34. The trigger 40 slides freely with respect to the handle 34 for movement between an extended position, a depressed position, and a plurality of trigger positions therebetween. Generally, the position of the trigger 40 controls the operation of the electric motor 28. The electric motor 28 remains in the unpowered state when the trigger 40 is in the extended position. Movement of the trigger 40 from the extended position towards the depressed position places the electric motor 28 in the power state. Further, each trigger position of the plurality of trigger positions may correspond to a particular motor speed. Additionally, the motor speed may not increase after the trigger 40 has moved past a predetermined trigger position located between the extended position and the depressed position. For example, the motor speed may not increase after the trigger 40 has moved past a predetermined trigger position corresponding to approximately 70 percent of the distance between the extended position and the depressed position of the trigger 40.

The handheld power tool 20 may have an AC power cord 42 extending through the housing 32 for supplying electricity to the electric motor 28. More particularly, at least one motor lead 44 may be disposed within the housing 32 that is electrically connected to AC power cord 42 and the electric motor 28. The at least one motor lead 44 may take many forms and provides a controlled level of electricity to the electric motor 28. By way of example, and without limitation, the at least one motor lead 44 may be a wire. Still referring to FIGS. 1-3, it should also be noted that where the handheld power tool 20 is a jigsaw, a shoe 46 may be fixed to the housing 32 or pivotally connected to the housing 32. The shoe 46 generally presents a bottom surface 48 facing away from the housing 32 for abutting a work piece.

Figure 4:
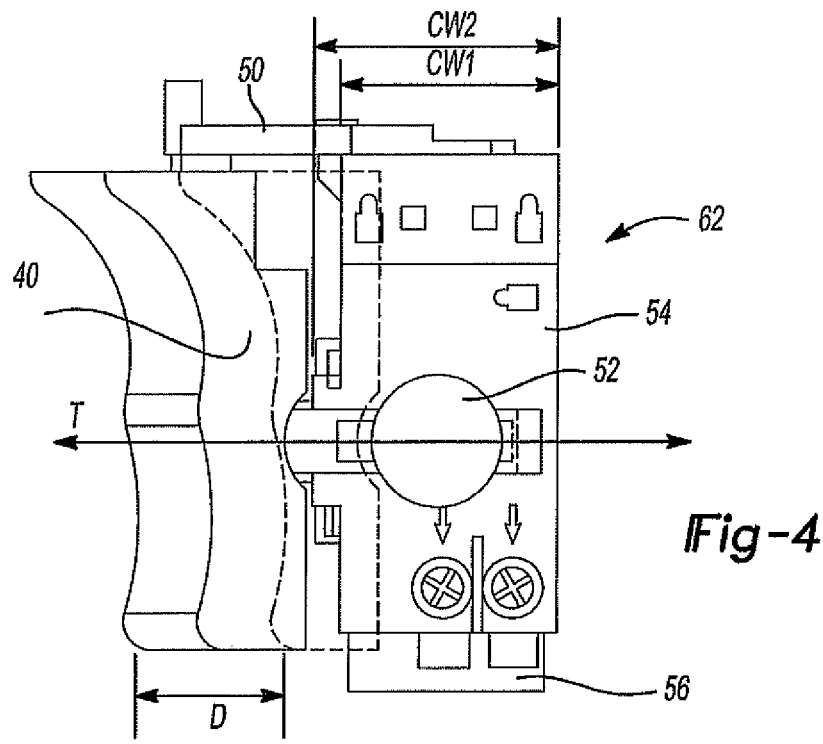
FIG. 4 is a side elevation view of an exemplary compact AC switch constructed in accordance with the present teachings.
Figure 5:
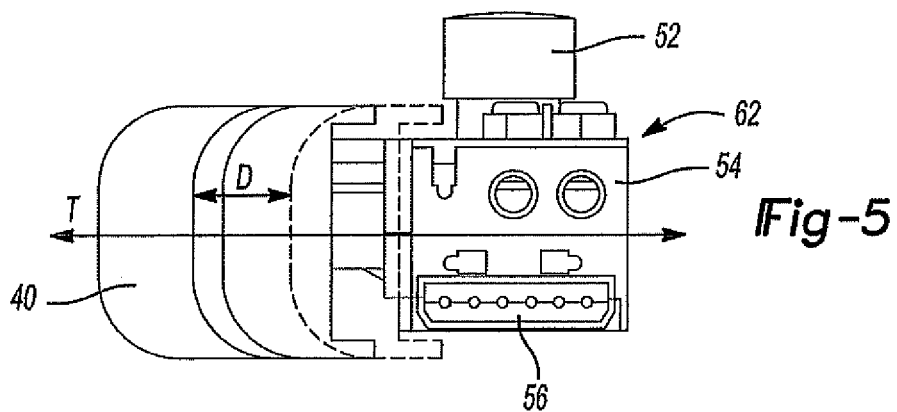
FIG. 5 is a bottom elevation view of the exemplary compact AC switch and illustrates a pin connector constructed in accordance with the present teachings.
Figure 6:
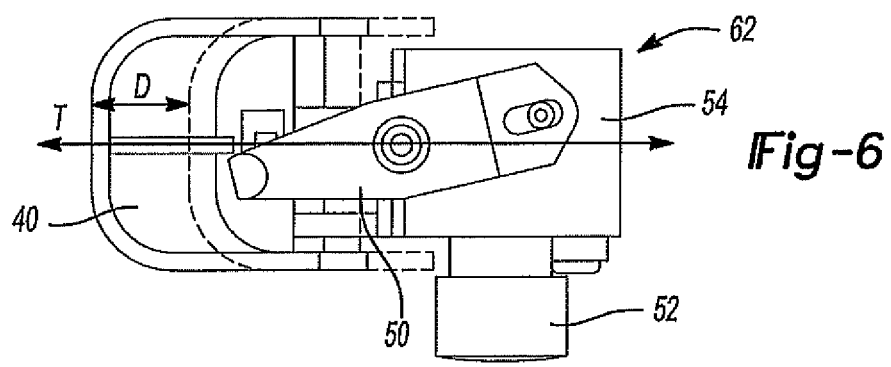
FIG. 6 is a top elevation view of the exemplary compact AC switch and illustrates a motor direction selector constructed in accordance with the present teachings.

Now referring to FIGS. 4-6, the trigger 40 defines an axis of trigger travel T. The axis of trigger travel T intersects the trigger 40 when the trigger 40 is in the extended position and when the trigger 40 is in the depressed position such that the trigger 40 moves linearly along the axis of trigger travel T. The trigger 40 also defines a trigger travel distance D extending from the extended position to the depressed position. Accordingly, the trigger travel distance D is measured along the axis of trigger travel T and is the distance between the extended position of the trigger 40 and the depressed position of the trigger 40. In other words, the trigger travel distance D may be described as the length of pull or the stroke length of the trigger 40. The handheld power tool 20 may optionally include a motor direction selector 50. The motor direction selector 50 extends at least partially through the handle 34. The motor direction selector 50 is movably received in the handle 34 for movement between a forward position and a reverse position. The forward position and the reverse position correspond to the direction of rotation of the electric motor 28. Additionally, the handheld power tool 20 may optionally include a trigger lock 52 extending at least partially through the handle 34. The trigger lock 52 is movably received in the handle 34 for movement between a locked position and an unlocked position. The trigger lock 52 engages the trigger 40 in the locked position to limit movement of the trigger 40 along the axis of trigger travel T. Accordingly, the trigger 40 can be locked in the depressed position such that the electric motor 28 can be maintained in the powered state without the user applying continuous pressure to the trigger 40. Alternatively, the trigger 40 can be locked in the extended position such that inadvertent activation of the electric motor 28 to the powered state may be avoided. The structure of the trigger lock 52 can take a variety of forms. For example, the trigger lock 52 may have a push-button connected to a pin that engages a hole formed in the trigger 40.

Figure 7:
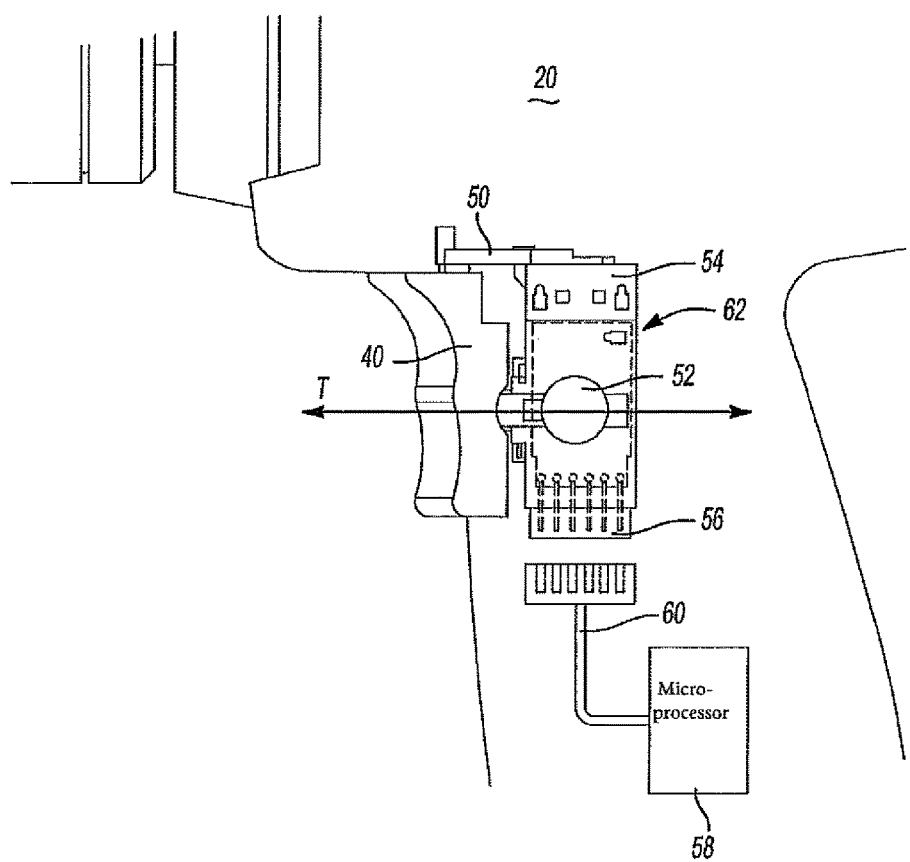
FIG. 7 is a side elevation view of the exemplary compact AC switch installed in another exemplary handheld power tool and illustrates the compact AC switch of the present teachings being connected to a microprocessor.

Referring to FIGS. 3-7, a trigger switch cover 54 may be disposed within the handle 34 adjacent the trigger 40. The trigger switch cover 54 presents a pin connector 56 for connection with a microprocessor 58. The trigger switch cover 54 has a first switch cover width CW1 along a majority of its length. Adjacent the axis of trigger travel T, the trigger switch cover 54 may have a second switch cover width CW2 that is slightly larger than the first switch cover width CW1. For example, the first switch cover width CW1 may equal approximately 19 millimeters (mm) and the second switch cover width CW2 may equal approximately 22 millimeters (mm). In FIG. 7, the handheld power tool 20 is a drill and the trigger switch cover 54 and the microprocessor 58 are shown disposed within the handle 34. The microprocessor 58 may be connected to the pin connector 56 of the trigger switch cover 54 by a multi-wire cable 60. In an alternative embodiment, the trigger switch cover 54 may be disposed within the handle 34 while the microprocessor 58 may be disposed elsewhere in the housing 32. As such, the handle 34 can be made smaller because it does not need to accommodate the size of the microprocessor 58. The microprocessor 58 is an optional element and provides digital control of the electric motor 28. In embodiments that do not include the microprocessor 58, the motor speed of the electric motor 28 generally increases linearly with trigger position in an analogue manner. In the embodiments where the microprocessor 58 is included, the linear relationship between motor speed and trigger position can be altered to provide features such as soft-start, where the motor speed increases more slowly over trigger positions that are adjacent the extended position. Digital control of the electric motor 28 provides this flexibility.

Figure 8:
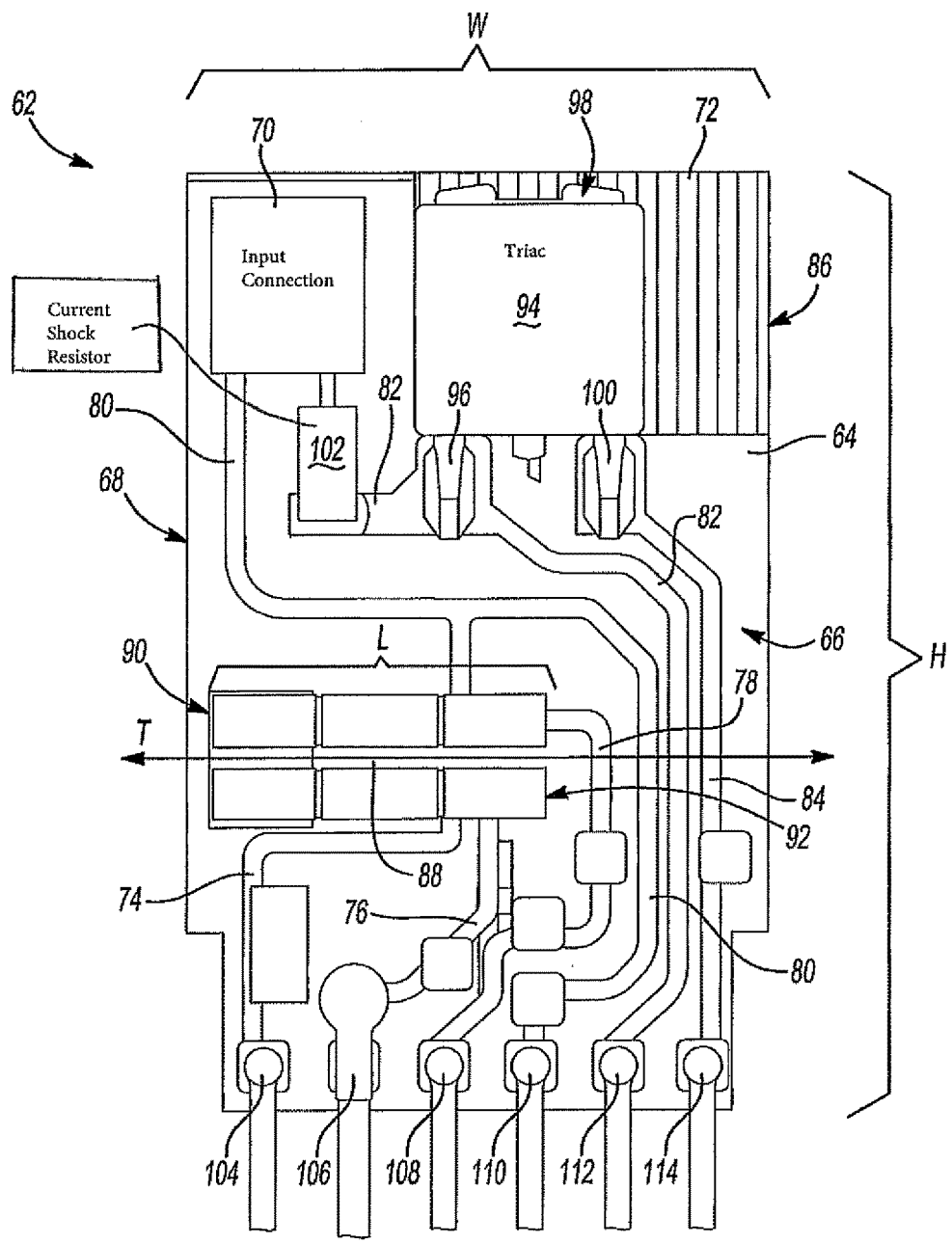
FIG. 8 is a side elevation view of the exemplary compact AC switch and illustrates a printed circuit board constructed in accordance with the present teachings.
Figure 9:
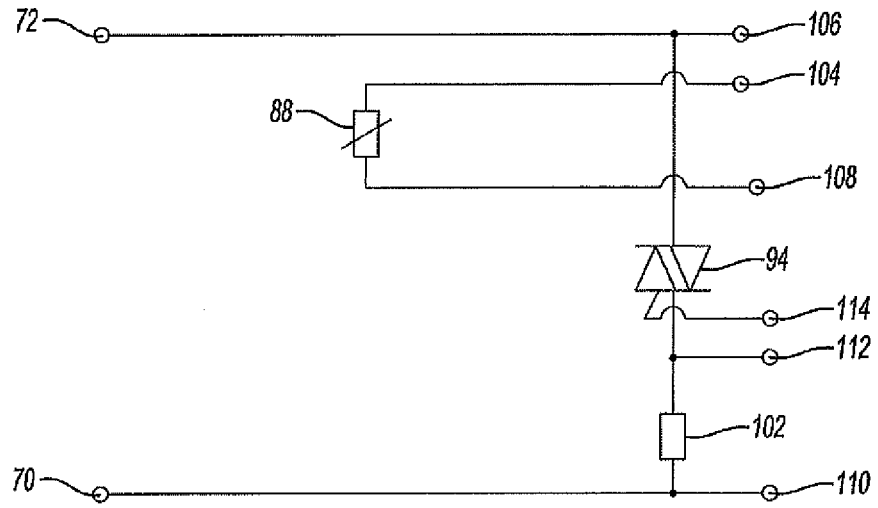
FIG. 9 is a circuit diagram of an exemplary compact AC switch constructed for connection with the microprocessor.

Referring to FIGS. 8 and 9, a trigger switch 62 is illustrated for use in conjunction with the microprocessor 58. The trigger switch 62 is disposed within the trigger switch cover 54. The trigger switch 62 includes a printed circuit board 64 having a first face 66 and a second face 68. The first face 66 of the printed circuit board 64 generally has an input connection 70 and an output connection 72 and a plurality of conductive traces 74, 76, 78, 80, 82, 84 interconnecting the input connection 70 and the output connection 72. The second face 68 of the printed circuit board 64 is thermally coupled to a heat sink plate 86. The printed circuit board 64 has a width W measurable along the axis of trigger travel T and a height H measurable in a direction that is transverse to the axis of trigger travel T. It should be appreciated that the printed circuit board 64 need not be rectangular in shape as shown in FIG. 8, but may take a variety of different shapes. The width W of the circuit board is not necessarily the overall width of the printed circuit board 64 as measured at its widest point, but is simply the width W of the printed circuit board 64 as measured along the axis of trigger travel T. As such, the width W of the printed circuit board 64 necessarily corresponds to a region of the printed circuit board 64 adjacent the trigger 40.

Still referring to FIGS. 8 and 9, the trigger switch 62 includes a variable resistor 88 mounted to the first face 66 of the printed circuit board 64. The variable resistor 88 is electrically connected to the input connection 70 of the printed circuit board 64. The variable resistor 88 is also disposed in sliding engagement with the trigger 40 along the axis of trigger travel T. As such, the variable resistor 88 controls the motor speed of the electric motor 28 in accordance with position of the trigger 40 in relation to the variable resistor 88. The variable resistor 88 has an outboard end 90 and an inboard end 92. The outboard end 90 of the variable resistor 88 generally corresponds to the extended position of the trigger 40 and the inboard end 92 of the variable resistor 88 generally corresponds to the depressed position of the trigger 40. The variable resistor has a predetermined length L extending between the outboard end 90 and the inboard end 92. However, the predetermined length L of the variable resistor 88 is slightly larger than the trigger travel distance D.

The trigger switch 62 also includes a triac 94 mounted to the first face 66 of the printed circuit board 64. The triac 94 has a first terminal 96, a second terminal 98, and a third terminal 100. The second terminal 98 may generally be disposed between the triac 94 and the first face 66 of the printed circuit board 64 and is electrically connected to the output connection 72. The first terminal 96 and the third terminal 100 of the triac 94 are electrically connected to the plurality of conductive traces 74, 76, 78, 80, 82, 84 of the printed circuit board 64 as will be described in more detail below. The trigger switch 62 also includes a current shock resistor 102 mounted to the first face 66 of the printed circuit board 64. The current shock resistor 102 may take several forms including, but not limited to, an ultra-low ohmic chip resistor. The current shock resistor 102 is electrically connected to the conductive traces 74, 76, 78, 80, 82, 84 of the printed circuit board 64 as will be explained in greater detail below.

Referring to FIG. 8, the plurality of conductive traces 74, 76, 78, 80, 82, 84 of the printed circuit board 64 are sequentially arranged and linearly aligned adjacent the inboard end 92 of the variable resistor 88 in a direction that is transverse to the axis of trigger travel T. The arrangement of the conductive traces 74, 76, 78, 80, 82, 84 shown in FIG. 8 reduces the width W of the printed circuit board 64 to a value that is less than or equal to three times the trigger travel distance D. In other words, the trigger travel distance D equals at least 33 percent of the width W of the printed circuit board 64 in the region adjacent the trigger 40. It should be appreciated that the size of the printed circuit board 64 may vary. For example, the trigger travel distance D may equal at least 35 percent or even 40 percent of the width W of the printed circuit board 64. Using the trigger switch cover 54 as a reference, the trigger travel distance D may equal at least 35 percent of the first switch cover width CW1 or at least 30 percent of the second switch cover width CW2. In addition, the predetermined length L of the variable resistor 88 may vary without departing from the present disclosure. For example, the predetermined length L of the variable resistor 88 may occupy at least 50 percent of the width W of the printed circuit board 64 in the region adjacent the trigger 40. In the embodiment shown in FIG. 8, the predetermined length L of the variable resistor 88 is approximately 8.75 millimeters (mm) and the trigger travel distance D is approximately 7 millimeters (mm). Meanwhile, the width W of the printed circuit board 64 is approximately 16 millimeters (mm) and the height H of the printed circuit board 64 is approximately 24.4 millimeters (mm).

Advantageously, the width W of the printed circuit board 64 is reduced allowing for a thinner handle 34 with improved ergonomics. This benefit improves the use of space within the housing 32 and the handle 34 and allows for new packaging configurations of handheld power tools 20 that were not previously obtainable. For example, previous jigsaws were limited to the handle 34 shown in FIG. 3 where the handle 34 generally arcs upwardly and the trigger 40 is positioned above the housing 32. The disclosed trigger switch 62 allows for a thinner handle 34 for the configuration shown in FIG. 3, but also allows for the handle 34 to be integrated into the housing 32 as shown in FIGS. 1 and 2 where the trigger 40 is positioned below the housing 32 and above the shoe 46. While reducing the width W of the printed circuit board 64, it may be additionally advantageous to maintain a significant trigger travel distance D such as a trigger travel distance of approximately 7 millimeters (mm). Accordingly, the disclosed trigger switch 62 is desirable because the width W of the printed circuit board 64 is reduced, while at the same time, the trigger travel distance D remains unchanged.

Referring again to FIG. 8, the close proximity of the plurality of conductive traces 74, 76, 78, 80, 82, 84 presents arcing problems where electricity jumps from one trace to another in an unwanted manner. Such arcing can damage the printed circuit board 64 and the components mounted thereto. The close proximity of the plurality of conductive traces 74, 76, 78, 80, 82, 84 and the components mounted on the printed circuit board 64 also presents a problem with increased heat generation. Heat generally degrades the printed circuit board 64 and the electrical components mounted thereto and can lead to damages. Accordingly, the plurality of conductive traces 74, 76, 78, 80, 82, 84 are made of a copper and silver alloy to prevent electrical arcing between the sequentially arranged conductive traces 74, 76, 78, 80, 82, 84. It has been found that the potential for arcing is reduced with the use of the copper and silver alloy as opposed to more conventional conductors such as pure copper. Further, the heat sink plate 86 of the trigger switch 62 is made of copper for improved heat transfer characteristics necessitated by increased heat generated by the sequentially arranged conductive traces 74, 76, 78, 80, 82, 84. It has been found that the heat sink plate 86 has better heat transfer characteristics when the heat sink plate 86 is made of copper in contrast to other more conventional metals such as aluminum.

Referring to FIGS. 8 and 9, the trigger switch 62 presents a plurality of pins 104, 106, 108, 110, 112, 114 that extend through the trigger switch cover 54 to form the pin connector 56. The plurality of pins 104, 106, 108, 110, 112, 114 includes a first pin 104, a second pin 106, a third pin 108, a fourth pin 110, a fifth pin 112, and a sixth pin 114. Similarly, the plurality of conductive traces 74, 76, 78, 80, 82, 84 of the printed circuit board 64 includes a first conductive trace 74, a second conductive trace 76, a third conductive trace 78, a fourth conductive trace 80, a fifth conductive trace 82, and a sixth conductive trace 84. The first conductive trace 74 electrically connects the variable resistor 88 to the first pin 104. The second conductive trace 76 electrically connects the variable resistor 88 to the second pin 106. The third conductive trace 78 electrically connects the variable resistor 88 to the third pin 108. The fourth conductive trace 80 electrically connects the input connection 70 to the variable resistor 88 and the fourth pin 110. The fifth conductive trace 82 electrically connects the input connection 70 to the current shock resistor 102, the current shock resistor 102 to the first terminal 96 of the triac 94, and the first terminal 96 of the triac 94 to the fifth pin 112. Finally, the sixth conductive trace 84 electrically connects the third terminal 100 of the triac 94 to the sixth pin 114. In the embodiments where the microprocessor 58 is included in the handheld power tool 20, the microprocessor 58 is electrically connected to each of the plurality of pins 104, 106, 108, 110, 112, 114 by way of the pin connector 56 and the multi-wire cable 60. The microprocessor 58 includes a plurality of passive filtering components (not shown) that interact with the variable resistor 88, the current shock protector, and the triac 94 of the printed circuit board 64 to digitally control the electricity supplied electric motor 28 by the trigger switch 62.

Figure 10:
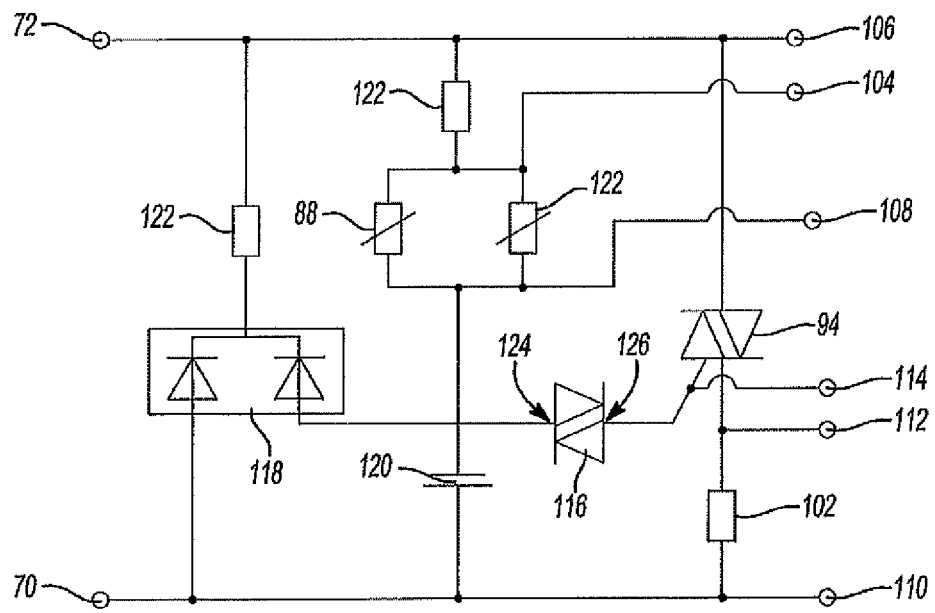
FIG. 10 is a circuit diagram of another exemplary compact AC switch constructed for standalone operation without the aid of the microprocessor.

Referring now to FIG. 10, the trigger switch 62 may be constructed to operate in an analogue manner without the aid of the microprocessor 58. In this embodiment, additional electrical components are added to the printed circuit board 64 to accomplish some of the passive filtering functions of the missing microprocessor 58. These additional electrical components may include a diac 116, a double diode 118, a capacitor 120, and at least one resistor 122. The diac 116 is mounted to the printed circuit board 64 and is electrically connected to the variable resistor 88 and the triac 94. More particularly, the diac 116 has a first terminal 124 and a second terminal 126. The first terminal 124 of the diac 116 may be electrically connected to the third conductive trace 78 and the second terminal 126 of the diac 116 may be electrically connected to the sixth conductive trace 84. The double diode 118 is mounted to the printed circuit board 64 and is electrically connected to the variable resistor 88. The capacitor 120 is mounted to the printed circuit board 64 and is electrically connected to the variable resistor 88 and the diac 116. The at least one resistor 122 is mounted to the printed circuit board 64 and is electrically connected to the variable resistor 88 and the double diode 118. These electrical components work in concert to replace the microprocessor 58 and control the electric motor 28 in an analogue manner.

The foregoing description of the aspects of the present teachings has been provided for purposes of illustration and description. It is not intended to be exhaustive or to limit the disclosure. Individual elements or features of a particular aspect are generally not limited to that particular aspect, but, where applicable, are interchangeable and can be used in a selected aspect, even if not specifically shown or described. The same may also be varied in many ways. Such variations are not to be regarded as a departure from the disclosure, and all such modifications are intended to be included within the scope of the disclosure. In some example aspects, well-known processes, well-known device structures, and well-known technologies are not described in detail.

The terminology used herein is for the purpose of describing particular example aspects of the present teachings only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptors used herein interpreted accordingly.

These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A power tool having a compact AC switch assembly, comprising:
    an electric motor;
    a housing containing said electric motor and including a handle;
    a trigger slidingly received in and at least partially extending through said handle that moves along an axis of trigger travel between an extended position and a depressed position;
    said trigger defining a trigger travel distance extending from said extended position to said depressed position;
    a trigger switch attached to said trigger to control said electric motor in accordance with position of said trigger in relation to said trigger switch; and
    said trigger switch including a printed circuit board having a width extending along said axis of trigger travel wherein said width of said printed circuit board equals a value that is less than or equal to three times said trigger travel distance;
    wherein said printed circuit board includes an input connection configured to receive electricity and an output connection configured to supply electricity to said electric motor and a plurality of conductive traces electrically connecting said input connection and said output connection, said plurality of conductive traces being sequentially arranged and linearly aligned adjacent said trigger in a direction transverse to said axis of trigger travel to reduce said width of said printed circuit board.

2. A power tool having a compact AC switch assembly as set forth in claim 1 wherein said plurality of conductive traces are made of a copper and silver alloy to prevent electrical arcing between said sequentially arranged conductive traces.

3. A power tool having a compact AC switch assembly as set forth in claim 1 further including a heat sink plate thermally coupled to said printed circuit board wherein said heat sink plate is made of copper.

4. A power tool having a compact AC switch assembly as set forth in claim 1 wherein said trigger travel distance is greater than or equal to 35 percent of said width of said printed circuit board.

5. A power tool having a compact AC switch assembly as set forth in claim 1 wherein said trigger travel distance is greater than or equal to 40 percent of said width of said printed circuit board.

6. A power tool having a compact AC switch assembly as set forth in claim 1 wherein said trigger switch includes a variable resistor mounted on said printed circuit board along said axis of trigger travel and electrically connected to said plurality of conductive traces.

7. A power tool having a compact AC switch assembly as set forth in claim 6 wherein said variable resistor is disposed in sliding engagement with said trigger to control said electric motor in accordance with position of said trigger in relation to said trigger switch.

8. A power tool having a compact AC switch assembly as set forth in claim 7 wherein said variable resistor has an outboard end corresponding with said extended position of said trigger and an inboard end corresponding with said depressed position of said trigger and a predetermined length extending between said outboard end and said inboard end being greater than or equal to said trigger travel distance.

9. A power tool having a compact AC switch assembly as set forth in claim 8 wherein said plurality of conductive traces of said printed circuit board are sequentially arranged and linearly aligned adjacent said inboard end of said variable resistor to reduce said width of said printed circuit board.

10. A power tool having a compact AC switch assembly as set forth in claim 9 wherein said width of said printed circuit board equals a value that is less than or equal to two times said predetermined length of said variable resistor.

11. A power tool having a compact AC switch assembly as set forth in claim 10 wherein said trigger switch includes a triac mounted to said printed circuit board and electrically connected to said output connection and a current shock resistor mounted to said printed circuit board and electrically connected to said input connection and said triac.

12. A power tool having a compact AC switch assembly as set forth in claim 11 further including an AC power cord extending through said housing and being electrically connected to said input connection of said printed circuit board.

13. A power tool having a compact AC switch assembly as set forth in claim 11 further including:
    a diac mounted to said printed circuit board and electrically connected to said variable resistor and said triac;
    a double diode mounted to said printed circuit board and electrically connected to said variable resistor;

a capacitor mounted to said printed circuit board and electrically connected to said variable resistor and said diac; and at least one resistor mounted to said printed circuit board and electrically connected to said variable resistor and said double diode.

14. A power tool having a compact AC switch assembly as set forth in claim 9 further including a trigger switch cover housing said trigger switch and having a pin connector mounted to said printed circuit board and configured to connect with a microprocessor that digitally controls said electric motor.

15. A power tool having a compact AC switch assembly as set forth in claim 9 further including a motor direction selector movably received in said handle that moves between a forward position and a reverse position corresponding to a direction of rotation of said electric motor.

16. A power tool having a compact AC switch assembly as set forth in claim 9 further including a trigger lock movably received in said handle that moves between a locked position and an unlocked position wherein said trigger lock engages said trigger in said locked position to limit movement of said trigger along said axis of trigger travel.

17. A power tool having a compact AC switch assembly as set forth in claim 9 further including a driven shaft coupled to said electric motor wherein said driven shaft presents an end configured to receive a tool.

18. A power tool having a compact AC switch assembly as set forth in claim 17 wherein the handheld power tool is a jigsaw and said driven shaft has an end configured to receive a saw blade and drive the saw blade in a reciprocating motion.

19. A power tool having a compact AC switch assembly as set forth in claim 18 further including a shoe pivotally connected to said housing wherein said shoe presents a bottom surface facing away from said housing that is configured to abut a work piece.

20. A power tool having a compact AC switch assembly as set forth in claim 17 wherein the handheld power tool is a drill and said driven shaft has an end configured to receive a bit and drive the bit rotationally.

21. A power tool having a compact AC switch assembly as set forth in claim 17 wherein the handheld power tool is a sander and said driven shaft has an end configured to drive a sanding pad.

22. A power tool having a compact AC switch assembly, comprising:

A driven shaft having an end configured to receive a tool;

an electric motor having a direction of rotation and a plurality of motor speeds, said electric motor being coupled to said driven shaft to drive said driven shaft;

a housing containing said electric motor and including a handle;

a trigger slidingly received in and extending at least partially through said handle to provide movement between an extended position and a depressed position and a plurality of positions therebetween each corresponding to said plurality of motor speeds;

a trigger switch disposed within said handle including a printed circuit board having an input connection configured to receive electricity and an output connection configured to supply electricity to said electric motor and a plurality of conductive traces interconnecting said input connection and said output connection;

at least one motor lead disposed within said housing and being electrically connected to said output connection of said printed circuit board and said electric motor to supply electricity from said trigger switch to said electric motor;

said trigger switch including a variable resistor electrically connected to said plurality of conductive traces and disposed in sliding engagement with said trigger to control said electric motor in accordance with position of said trigger in relation to said trigger switch;

said trigger switch including a triac electrically connected to said output connection of said printed circuit board;

said trigger switch including a current shock resistor electrically connected to said input connection of said printed circuit board; and said trigger switch including a pin connector configured to connect with a microprocessor that digitally controls said electric motor, said pin connector being mounted to said printed circuit board and electrically connected to said input connection and said output connection and said variable resistor and said triac and said current shock resistor by said plurality of conductive traces;

wherein said trigger switch presents a plurality of pins forming said pin connector, said plurality of pins including a first pin and a second pin and a third pin and a fourth pin and a fifth pin and a sixth pin;

wherein said plurality of conductive traces include a first conductive trace and a second conductive trace and a third conductive trace and a fourth conductive trace and a fifth conductive trace and a sixth conductive trace.

23. A power tool having a compact AC switch assembly as set forth in claim 22 wherein said triac has a first terminal and a second terminal electrically connected to said output connection and a third terminal.

24. A power tool having a compact AC switch assembly as set forth in claim 23 wherein said first conductive trace electrically connects said variable resistor to said first pin.

25. A power tool having a compact AC switch assembly as set forth in claim 24 wherein said second conductive trace electrically connects said variable resistor to said second pin.

26. A power tool having a compact AC switch assembly as set forth in claim 25 wherein said third conductive trace electrically connects said variable resistor to said third pin.

27. A power tool having a compact AC switch assembly as set forth in claim 26 wherein said fourth conductive trace electrically connects said input connection to said variable resistor and said fourth pin.

28. A power tool having a compact AC switch assembly as set forth in claim 27 wherein said fifth conductive trace electrically connects said input connection to said current shock resistor and said first terminal of said triac and said fifth pin.

29. A power tool having a compact AC switch assembly as set forth in claim 28 wherein said sixth conductive trace electrically connects said third terminal of said triac to said sixth pin.

30. A handheld power tool having a compact AC switch assembly, comprising:

a driven shaft having an end configured to receive a tool;

an electric motor having a direction of rotation and a plurality of motor speeds, said electric motor being coupled to said driven shaft to drive said driven shaft;

a housing containing at least said electric motor and including a handle;

a trigger being slidingly received in and extending at least partially through said handle to provide movement between an extended position and a depressed position and a plurality of positions therebetween each corresponding to said plurality of motor speeds;

said trigger defining an axis of trigger travel and a trigger travel distance extending from said extended position to said depressed position;
a motor direction selector extending at least partially through said handle and being movably received in said handle to provide movement between a forward position and a reverse position corresponding to said direction of rotation of said electric motor;
a trigger lock extending at least partially through said handle and being movably received in said handle to provide movement between a locked position and an unlocked position, said trigger lock engaging said trigger in said locked position to limit movement of said trigger along said axis of trigger travel;
a trigger switch cover disposed within said handle adjacent said trigger;
a trigger switch disposed within said trigger switch cover including a printed circuit board having a first face and a second face;
said first face of said printed circuit board having an input connection configured to receive electricity and an output connection configured to supply electricity to said electric motor and a plurality of conductive traces interconnecting said input connection and said output connection;
said second face of said printed circuit board being thermally coupled to a heat sink plate;
said printed circuit board having a width measurable along said axis of trigger travel;
said trigger switch including a variable resistor mounted to said first face of said printed circuit board and being electrically connected to said input connection;
said variable resistor being disposed in sliding engagement with said trigger along said axis of trigger travel to control said electric motor in accordance with position of said trigger in relation to said variable resistor;
said variable resistor having an outboard end corresponding to said extended position of said trigger and an inboard end corresponding to said depressed position of said trigger;
said variable resistor having a predetermined length extending between said outboard end and said inboard end being greater than or equal to said trigger travel distance;
said trigger switch including a triac mounted to said first face of said printed circuit board and having a first terminal and a second terminal and a third terminal, said second terminal being electrically connected to said output connection;

an AC power cord extending through said housing and being electrically connected to said input connection of said printed circuit board to supply electricity to said printed circuit board;
at least one motor lead disposed within said housing and being electrically connected to said output connection of said printed circuit board and said electric motor to supply electricity from said trigger switch to said electric motor;
said plurality of conductive traces of said printed circuit board being sequentially arranged and linearly aligned adjacent said inboard end of said variable resistor in a direction transverse to said axis of trigger travel to reduce said width of said printed circuit board to a value that is less than or equal to two times said predetermined length of said variable resistor;
said plurality of conductive traces being made of a copper and silver alloy to prevent electrical arcing between said sequentially arranged conductive traces;
said heat sink plate of said trigger switch being made of copper to improve heat transfer away from said sequentially arranged conductive traces;
said trigger switch including a current shock resistor mounted on said printed circuit board and electrically connected to said plurality of conductive traces;
said trigger switch cover presenting a pin connector configured to connect with a microprocessor that digitally controls said electric motor;
said trigger switch presenting a plurality of pins extending through said trigger switch cover to form said pin connector, said plurality of pins including a first pin and a second pin and a third pin and a fourth pin and a fifth pin and a sixth pin;
said plurality of conductive traces including a first conductive trace and a second conductive trace and a third conductive trace and a fourth conductive trace and a fifth conductive trace and a sixth conductive trace;
said first conductive trace electrically connecting said variable resistor to said first pin;
said second conductive trace electrically connecting said variable resistor to said second pin;
said third conductive trace electrically connecting said variable resistor to said third pin;
said fourth conductive trace electrically connecting said input connection to said variable resistor and said fourth pin;
said fifth conductive trace electrically connecting said input connection to said current shock resistor and said first terminal of said triac and said fifth pin; and
said sixth conductive trace electrically connecting said third terminal of said triac to said sixth pin.

* * * * *